United States Patent
Langsdorf et al.

(10) Patent No.: US 7,377,130 B2
(45) Date of Patent: May 27, 2008

(54) METHOD FOR MAKING GLOBULAR BODIES

(75) Inventors: Andreas Langsdorf, Ingelheim a. M. (DE); Frank Buellesfeld, Frankfurt (DE)

(73) Assignee: Schott AG, Mainz (DE)

( * ) Notice: Subject to any disclaimer, the term of this patent is extended or adjusted under 35 U.S.C. 154(b) by 463 days.

(21) Appl. No.: 10/770,311

(22) Filed: Feb. 2, 2004

(65) Prior Publication Data

US 2004/0163413 A1 Aug. 26, 2004

(30) Foreign Application Priority Data

Feb. 5, 2003 (DE) ................ 103 05 422

(51) Int. Cl.
*C03B 37/00* (2006.01)
(52) U.S. Cl. .................. 65/25.1; 65/182.2; 65/304
(58) Field of Classification Search ............. 65/25.1, 65/182.1, 182.2, 304, 305; 226/97, 97.3; 406/88, 89; 408/91
See application file for complete search history.

(56) References Cited

U.S. PATENT DOCUMENTS

| 1,638,593 | A | * | 8/1927 | Mulholland ................. 65/25.1 |
| 3,198,616 | A | * | 8/1965 | Havens ........................ 65/169 |
| 3,610,696 | A | * | 10/1971 | Fulton .......................... 34/583 |
| 3,731,823 | A | * | 5/1973 | Goth ............................ 406/88 |
| 3,961,927 | A | * | 6/1976 | Alderson et al. ............. 65/25.1 |
| 4,688,784 | A | * | 8/1987 | Wirz ............................ 271/195 |
| 5,107,981 | A | * | 4/1992 | Markus ....................... 198/721 |
| 5,336,288 | A | * | 8/1994 | Carlomagno et al. ...... 65/182.2 |
| 5,713,975 | A | * | 2/1998 | Schonfeld et al. ............ 65/25.1 |
| 5,762,673 | A | * | 6/1998 | Hirota et al. ................. 65/25.1 |
| 5,873,921 | A | * | 2/1999 | Hirota et al. ................. 65/25.1 |
| 5,922,097 | A | * | 7/1999 | Kobayashi et al. ......... 65/134.1 |
| 6,564,584 | B2 | * | 5/2003 | Hirota et al. ................. 65/25.1 |
| 6,626,010 | B1 | * | 9/2003 | Yoshida ....................... 65/25.1 |
| 2002/0092326 | A1 | | 7/2002 | Langsdorf et al. |
| 2003/0051508 | A1 | * | 3/2003 | Uezaki et al. .................. 65/66 |

FOREIGN PATENT DOCUMENTS

| DE | 100 62 954 A1 | | 7/2002 |
| JP | 63236718 A | * | 10/1988 |
| JP | 63274633 A | * | 11/1988 |
| JP | 02014839 A | * | 1/1990 |
| JP | 08277133 A | | 10/1996 |
| JP | 11199250 A | | 7/1999 |

OTHER PUBLICATIONS

YTH Translation of JP (A) H10-139465.*

* cited by examiner

*Primary Examiner*—Carlos Lopez
(74) *Attorney, Agent, or Firm*—Michael J. Striker

(57) ABSTRACT

The method of making globular or spherical bodies of optical quality includes filling receptacles (2) in a heat-resistant support (3) made of a porous material with glass gobs (1); conducting gas through the heat-resistant support so that a gas flow (4) passes through the support in a direction (14) opposite to a direction in which gravity acts; heating the heat-resistant support (3) to a temperature at which the glass gobs (1) have a viscosity of up to about $10^6$ poise; maintaining the support (3) at this temperature for a predetermined time interval; and then cooling the support (3) to ambient temperature while continuing to provide the gas flow (4) through the support (3).

10 Claims, 2 Drawing Sheets

METHOD FOR MAKING GLOBULAR BODIES

BACKGROUND OF THE INVENTION

The present invention relates to a method of making globular or spherical bodies of optical quality and an apparatus for performing this method.

Principally this sort of method is known from JP-H11-199250 A. In this method preferably cylindrical glass gobs are placed in receptacles in a heat-resistant support and are heated. Globular bodies form from the cylindrical glass gobs under the action of surface tension. The glass gobs are retained in the receptacles under vibration in this phase. The globular bodies so formed serve as optical lenses, for example in telecommunication equipment or also in CD players.

During heating of the glass gobs undesirable influences can occur at the contact positions between the glass gobs and the heat-resistant support during precise temperature guidance. The glass can stick or, more seriously, attach to the walls of the receptacles when the glass gobs have a certain viscosity. The resulting globular bodies with corresponding surface faults or defects are no longer universally usable. At best they can be aligned during usage so that these defects or faults are not aligned in the path of rays traveling through the optical system. However this is only possible with great effort and corresponding expense. The consequences of attachment of glass to the material of the support are still more serious. They must be replaced, whereby considerable additional costs result.

JP-08-277133 discloses an additional method for making globular bodies. In this method a melted glass gob is placed in a receptacle with a trumpet-shaped opening, while gas is conducted from a small hole into the receptacle from below so that the melted glass gob does not come into contact with the interior surface of the receptacle. The glass gob is gently rotated and accordingly forms the globular body. First of all, the passage, through which the gas is conducted, must have a diameter of at least 300 µm because smaller passages are built into the support only with much effort or expense. In this known method temperature inhomogeneities result at the surface of the melted glass gob. Thus the surface region of the glass gob, which is directly exposed to the gas flow, is somewhat cooler than the opposite part of the spherical surface. This leads to internal stresses in the globular body and to additional shape variations and in sum total to optical aberrations. The internal stresses in the globular body could generally be avoided by expensive tempering of the gas flow.

SUMMARY OF THE INVENTION

It is an object of the present invention to provide a method of making globular or spherical bodies of optical quality, in which first the tendency of the glass gobs to stick on the heat-resistant support is reduced and second the surface quality of the resulting glass spheres or globes is improved.

It is also an object of the present invention to provide an apparatus for performing the method.

These objects are attained, for example, by the method claimed in the main independent method claim and the apparatus claimed in the main apparatus claim appended hereinbelow. Preferred embodiments are claimed in the appended dependent claims.

According to the invention the method comprises:

a) filling receptacles in a heat-resistant support made from a porous material with glass gobs;

b) conducting gas through the support so that a gas flow passes through the support in a direction opposite to a direction in which gravitational force acts;

c) heating the support to a temperature at which the glass gobs have a viscosity of up to about $10^6$ poise;

d) keeping the support at that temperature for a predetermined time interval; and e) then cooling the support to ambient temperature while continuing the conducting of the gas through the support.

The principles of gas bed support or gas film levitation are employed. However with the use of porous materials as in the case of the heat-resistant support a good correspondence between the shape of the receptacle in the support and the glass gob is necessary. Basically globular or spherical bodies on flat porous surfaces, from which gas flows out, cannot be levitated.

Surprisingly it has been shown that the levitation can be performed in the present case although the glass gobs, which are put in the receptacles in the support, do not necessarily have a shape that corresponds with that of the receptacles.

The glass gobs are, for example, scattered on the support prior to performing the method and distributed with a tool, such as a wiper or squeegee, so that each receptacle holds a glass gob. The size of the receptacles is preferably selected so that only one glass gob occupies each receptacle after distributing them with the wiper or squeegee. The support can have 2000 to 4000 receptacles. Each receptacle is heated until the glass gob in it has viscosity in the range of up to $10^6$ poise. The support and the glass gob are kept at this temperature. During this time interval a globular or spherical body is formed from the arbitrarily shaped glass gob because of surface tension properties. After that the support is cooled to ambient temperature, while the gas flow is maintained.

The described method can generally only be performed to make small globular or spherical bodies with less than 1 mm. The reason is that the surface tension behavior only automatically forms globular or spherical bodies from melted glass gobs of this size range. This works with a surface tension that is very large in relation to the hydrostatic pressure with the existing large surface curvature.

Porous graphite is the preferred material for the support. Of course the choice of materials is not limited.

Preferably the porosity of the support is between 10% and 40% and the pore size is in a range up to 20 µm. The pore size thus is in an entirely different range than the hole diameter of >300 µm in the case of the already mentioned JP-08-277133. In the method according to the present invention the gas passes through the porous support and is heated from its initial ambient temperature to the temperature of the support according to the principle of a heat exchanger, so that the above-described temperature inhomogeneities do not occur in the glass gobs. However pre-tempered glass can also be used. The gas flow from the pores is such that contact between the glass gobs and the support is completely avoided. The advantage of that is that the globular or spherical bodies do not have faults or defects anyplace on them, which would otherwise make the alignment of the globular bodies necessary, as has been described in connection with JP-H11-199250.

According to an especially preferred embodiment the receptacles in the support are adjusted or fit to the shape of the globular or spherical bodies to be produced. This means that the receptacles formed in the support are already hemispherical shaped. The levitation properties are thus improved and globular or spherical bodies with diameters up to 2 mm can be formed by the method according to the invention.

According to another preferred embodiment the receptacles in the support are blind holes or cavities. The advantage is that the support with the receptacles is less expensive to make. Furthermore a conical end of the blind hole or cavity acts to center the globular or spherical body.

The apparatus according to the invention comprises a support for performing the method formed so that its surface is impermeable to gas, except in the vicinity of the receptacles. Its surface is worked or coated so that gas actually passes through it only in the region of the receptacles. For example this can take place in the case of a sintered metal plate by mechanical working or clogging the surface pores by means of a mechanical grinding tool. The impermeable layer is interrupted then only at the location of the receptacles, whereby it is guaranteed that the gas only passes into the receptacles and not into intervening regions. Gas consumption is clearly reduced by this feature.

Thus the apparatus according to the invention for performing the above-described method includes
- a support comprising a porous material, in which a plurality of receptacles are provided and through which gas is conducted in a direction opposite to a direction in which gravity acts; and
- a heating device for heating and maintaining the support at temperatures at which glass gobs in the receptacles melt.

This minimal configuration already permits the performance of the method according to the invention with comparatively simple components.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

The same parts are provided with the same reference numbers in the figures showing the different embodiments.

Figure 1:
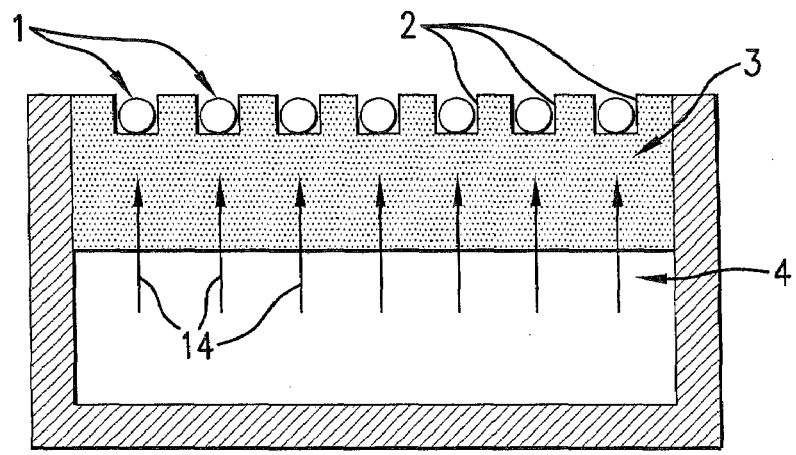
FIG. 1 is a schematic cross-sectional view through a gas-permeable support with receptacles for glass gobs according to a first embodiment of an apparatus for performing the method according to the invention.

The heat-resistant porous support 3 is shown in the schematic cross-sectional view according to FIG. 1. A plurality of receptacles 2 is built into or formed in its surface. These receptacles 2 are filled with glass gobs 1. For example this can take place by means of a wiper blade or squeegee or a similar tool.

A gas flow 4, for example of $N_2$, passes through the porous support 3 in a direction shown with arrows 14, which is opposite to a direction in which gravitational force acts. Then the apparatus is heated to a temperature, at which the glass gobs 1 melt and have a viscosity in the vicinity of up to $10^6$ poise. The surface tension behavior provides that the glass gobs 1 automatically form globular or spherical bodies. Any contact at the bottom and lateral walls of the receptacles is avoided because of levitation produced by the gas flow 4. When the globular or spherical bodies have formed, the apparatus is again cooled to room temperature.

Figure 2:
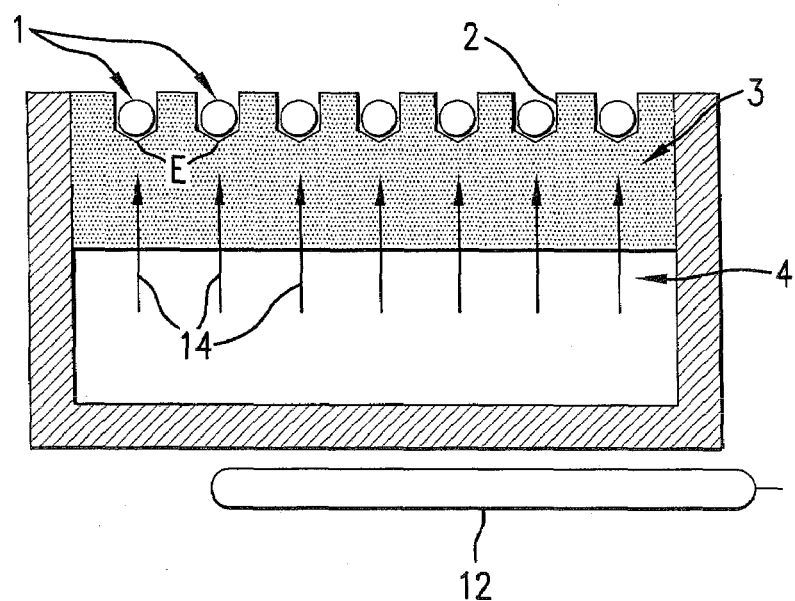
FIG. 2 is a schematic cross-sectional view through a gas-permeable support with receptacles for glass gobs according to another embodiment of the invention.

The embodiment according to FIG. 2 differs from that according to FIG. 1 because the shape of the receptacles 2 is different. The receptacles 2 are formed as blind holes or cavities. This has the advantage that the support 3 is comparatively inexpensive to make. Furthermore the conical ends E of the cavities in the embodiment of FIG. 2 act to center the glass gob 1 in it.

Figure 3:
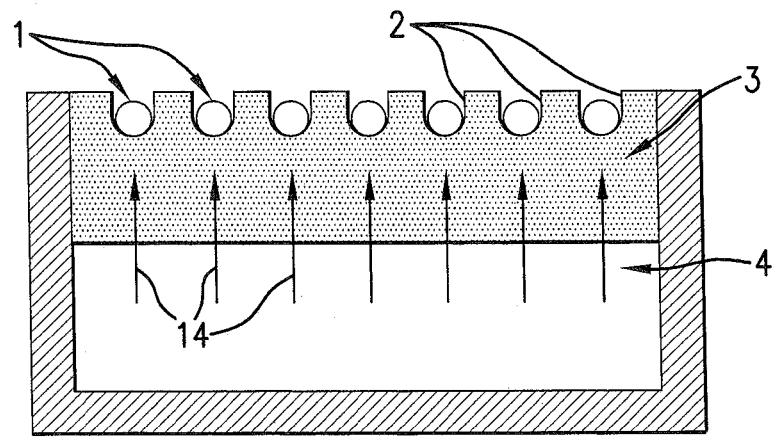
FIG. 3 is a schematic cross-sectional view through a gas-permeable support with receptacles for glass gobs according to still another embodiment of the invention.

FIG. 3 shows another embodiment, which is different from the embodiments of FIG. 1 and FIG. 2, because the shape of the receptacles 2 is different. The receptacles 2 in the embodiment of FIG. 3 are adjusted to the shape of the globular bodies to be made. This improves the levitation behavior so that globular bodies with diameters up to 2 mm can be made by the method according to the invention.

Figure 4:
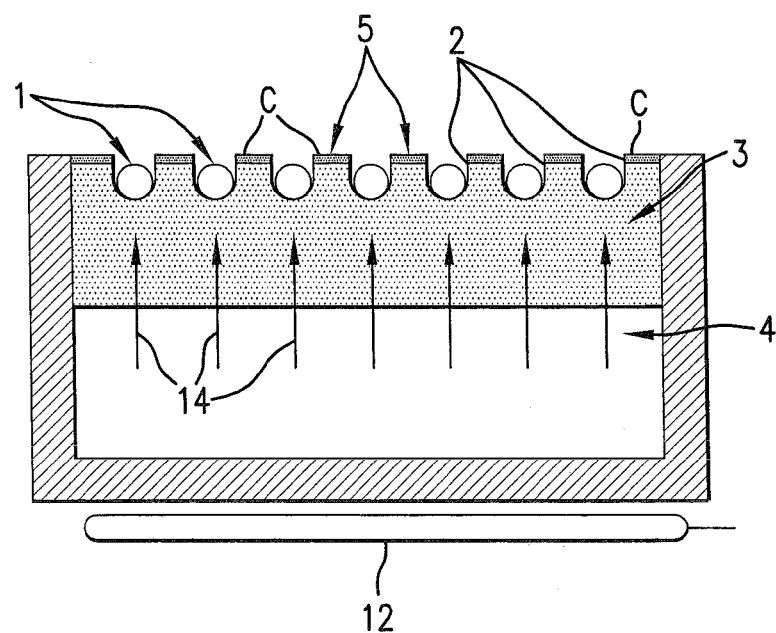
FIG. 4 is a schematic cross-sectional view through a gas-permeable support with receptacles for glass gobs according to an especially preferred embodiment of an apparatus for performing the method according to the invention.

FIG. 4 shows still another or additional embodiment, in which the receptacles 2 are adjusted to, fit or correspond to the shape of the globular or spherical bodies to be made, like in the embodiment of FIG. 3. However in this embodiment the surface of the support is only gas-permeable at positions, at which the receptacles 2 are found. In remaining regions the surface 5 is provided with a coating C, which is gas impermeable. Alternatively the surface 5 can be mechanically worked to close or clog the pores on the surface 5. This means that the gas flow 4 can leave the support 3 only in the vicinity of the receptacles 2. Because of that the gas consumption is considerably reduced in an especially beneficial manner.

The embodiments of the apparatus e.g. of FIGS. 2 and 4 are advantageously provided with a heating device 12, which is shown only formally.

The disclosure in German Patent Application 103 05 422.7 of Feb. 5, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for making globular or spherical bodies with optical quality from viscous glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making globular or spherical bodies of optical quality, said method comprising the steps of:
   a) filling receptacles (2) in a heat-resistant support (3) with glass gobs (1), said support (3) comprising a porous material;

b) conducting gas through the heat-resistant support (3) so that a gas flow (4) passes through the support (3) in a direction (14) opposite to a direction in which gravitational force acts;

c) heating the heat-resistant support (3) to a temperature at which the glass gobs (1) have a viscosity of up to about $10^6$ poise;

d) maintaining the support (3) at said temperature for a predetermined time interval; and e) then cooling the support (3) to ambient temperature while continuing to provide said gas flow (4) through the support (3).

2. The method as defined in claim 1, wherein said heat-resistant support (3) comprises porous graphite.

3. The method as defined in claim 1, wherein said heat-resistant support (3) made of said porous material has a porosity of between 10% and 40%.

4. The method as defined in claim 1, wherein said heat-resistant support (3) made of said porous material has pores with a pore size of up to about 20 µm.

5. The method as defined in claim 1, wherein said receptacles (2) have a shape adjusted to, corresponding to or fitting a shape of said globular or spherical bodies to be made.

6. The method as defined in claim 1, wherein said receptacles (2) are blind holes or cavities in a surface (5) of said support (3).

7. The method as defined in claim 6, further comprising providing said heat-resistant support (3) with said receptacles (2) and selecting a size of each of said receptacles so that each of said receptacles holds no more than one of said glass gobs.

8. The method as defined in claim 7, further comprising scattering said glass gobs on said heat-resistant support and distributing said glass gobs on said support with a tool so that each of said receptacles holds said one of said glass gobs.

9. A method of making globular or spherical bodies of optical quality, said method comprising the steps of:

a) providing a heat-resistant porous support (3) with receptacles (2), each of said receptacles being of a size such that no more than one of a plurality of glass gobs, from which said globular or spherical bodies are made, can be held therein;

b) filling said receptacles (2) in said heat-resistant support (3) with said glass gobs (1);

c) conducting gas through the heat-resistant porous support (3) so that a gas flow (4) passes through the heat-resistant porous support (3) in a direction (14) opposite to a direction in which gravitational force acts;

d) after the conducting of the gas through the heat-resistant porous support and after filling said receptacles with said glass gobs, heating the heat-resistant porous support (3) to a temperature at which the glass gobs (1) have a viscosity in the vicinity of up to about $10^6$ poise and until the glass gobs (1) have said viscosity;

e) maintaining the porous support (3) and the glass gobs at said temperature for a predetermined time interval; and f) then cooling the porous support (3) to ambient temperature while continuing to provide said gas flow (4) through the porous support (3).

10. The method as defined in claim 9, wherein said receptacles (2) are blind holes or cavities in a surface (5) of said heat-resistant support (3).

\* \* \* \* \*